United States Patent
Davoust et al.

(10) Patent No.: US 10,774,811 B2
(45) Date of Patent: Sep. 15, 2020

(54) INDUCTION CONTROLLED WIND TURBINE

(71) Applicant: General Electric Company, Schenectady, NY (US)

(72) Inventors: Samuel Davoust, Munich (DE); Thomas Stephen Markham, Schenectady, NY (US); Pranav Agarwal, Fremont, CA (US)

(73) Assignee: General Electric Company, Schenectady, NY (US)

( * ) Notice: Subject to any disclaimer, the term of this patent is extended or adjusted under 35 U.S.C. 154(b) by 36 days.

(21) Appl. No.: 15/968,207

(22) Filed: May 1, 2018

(65) Prior Publication Data
US 2019/0338755 A1 Nov. 7, 2019

(51) Int. Cl.
*F03D 9/00* (2016.01)
*H02P 9/04* (2006.01)
*F03D 7/04* (2006.01)
*F03D 17/00* (2016.01)
(Continued)

(52) U.S. Cl.
CPC .......... *F03D 7/046* (2013.01); *F03D 7/0224* (2013.01); *F03D 7/0272* (2013.01); *F03D 17/00* (2016.05); *H02P 9/04* (2013.01); *H02P 2101/15* (2015.01)

(58) Field of Classification Search
CPC ...... F03D 7/0024; F03D 7/0272; F03D 7/046; F03D 17/00; H02P 9/04
See application file for complete search history.

(56) References Cited

U.S. PATENT DOCUMENTS

| | | | |
|---|---|---|---|
| 7,342,323 B2* | 3/2008 | Avagliano | F03D 7/0224 290/55 |
| 7,522,976 B2* | 4/2009 | Stommel | F03D 7/0224 290/44 |
| 9,512,820 B2* | 12/2016 | Obrecht | F03D 7/0204 |

(Continued)

FOREIGN PATENT DOCUMENTS

| | | |
|---|---|---|
| CN | 104153942 A | 11/2014 |
| EP | 3 088 733 A1 | 11/2016 |
| WO | 2018007011 A1 | 1/2018 |

OTHER PUBLICATIONS

"Wind-turbine aerodynamics." retrieved on Jul. 31, 2019 from Wikipedia. Last edited Jan. 30, 2019.*

(Continued)

*Primary Examiner* — Tulsidas C Patel
*Assistant Examiner* — Thomas K Quigley
(74) *Attorney, Agent, or Firm* — Dority & Manning, P.A.

(57) ABSTRACT

A wind turbine includes a wind turbine rotor and rotor blades mounted on the rotor, at least one sensing device disposed on the wind turbine for measuring a first signal representative of a first wind speed at a first distance from the wind turbine rotor and a second signal representative of a second wind speed at a second distance from the wind turbine rotor. The wind turbine system includes a blade pitch actuator for adjusting a pitch of the rotor blades and a generator controller for adjusting a voltage of a wind turbine generator. The wind turbine system also includes a control unit in communication with the blade pitch actuator and the generator controller, the control unit being used for controlling the wind turbine via the blade pitch actuator and the generator controller based on an induction factor derived from the first and second signals.

17 Claims, 10 Drawing Sheets

(51) Int. Cl.
  *F03D 7/02* (2006.01)
  *H02P 101/15* (2016.01)

(56) References Cited

U.S. PATENT DOCUMENTS

| | | | |
|---|---|---|---|
| 9,835,138 B2* | 12/2017 | Westergaard | F03D 7/028 |
| 2006/0131889 A1* | 6/2006 | Corten | F03D 7/048 |
| | | | 290/43 |
| 2007/0067067 A1* | 3/2007 | Stommel | F03D 7/0224 |
| | | | 700/287 |
| 2009/0311097 A1* | 12/2009 | Pierce | F03D 7/0224 |
| | | | 416/42 |
| 2010/0119370 A1* | 5/2010 | Myhr | F03D 7/02 |
| | | | 416/39 |
| 2011/0031760 A1* | 2/2011 | Lugg | F03D 1/025 |
| | | | 290/55 |
| 2012/0070281 A1* | 3/2012 | Fuglsang | F03D 1/0641 |
| | | | 416/1 |
| 2014/0100800 A1 | 4/2014 | Prats Mustaros | |
| 2015/0152846 A1 | 6/2015 | Prats Mustaros et al. | |
| 2016/0230741 A1 | 8/2016 | Brath et al. | |
| 2016/0265509 A1 | 9/2016 | Movsichoff | |
| 2016/0265513 A1 | 9/2016 | Evans et al. | |
| 2017/0241404 A1* | 8/2017 | Kristoffersen | F03D 7/0224 |
| 2018/0017039 A1 | 1/2018 | Devoust et al. | |

OTHER PUBLICATIONS

Wang et al., "Lidar-Assisted Wind Turbine Feedforward Torque Controller Design Below Rated", American Control Conference, Jun. 4-6, 2014.

Borraccino et al., "Wind Field Reconstruction From Nacelle-Mounted Lidar Short-Range Measurements", Wind Energy Science, May 24, 2017, pp. 269-283.

Schlipf et al., "Prospects of Optimization of Energy Production by Lidar Assisted Control of Wind Turbines", EWEA 2011 Conference Proceedings, Mar. 14-17, 2011.

Extended European Search Report, dated Sep. 13, 2019.

Jason R. Marden et al, A Model-Free Approach to Wind Farm Control Using Game Theoretic Methods, IEEE Transactions on Control Systems Technology, vol. 21, No. 4, IEEE Service center, New York, NY, Jul. 1, 2013, pp. 1207-1214.

A. Giyanani et al, Estimation of rotor effective wind speeds using autoregressive models on Lidar data, Journal of Physics: Conference Series, vol. 753, Sep. 1, 2016, p. 072018.

Gunner Chr. Larsen et al, Full-scale measurements of aerodynamic induction in a rotor plane, Journal of Physics:Conference Series, vol. 555, No. 1, Institute of Physics Publishing, Bristol, GB, Dec. 16, 2014, p. 12063.

\* cited by examiner

INDUCTION CONTROLLED WIND TURBINE

BACKGROUND

Embodiments of the present specification generally relate to a wind turbine and more specifically to systems and methods for controlling a wind turbine.

Wind turbines are growing in popularity as a means of generating energy due to the renewable nature of the energy so generated and lack of pollution. Wind turbines generally have a rotor with a plurality of blades coupled to a generator. The power extraction capability and secure operation of a wind turbine typically depends on various factors including wind speed. For example, knowledge of potential wind speeds that will impact the rotor of the wind turbine in the following few seconds may be helpful in controlling the wind turbine for optimal power extraction.

Wind speeds are typically measured by an anemometer, such as a cup anemometer. However, anemometers are incapable of predicting the potential wind speeds that will impact the rotor of the wind turbine in the imminent future, since anemometers are only capable of measuring wind speed in the immediate surrounding area. Laser radar systems (LIDARs) have been employed for measuring wind speeds and direction of wind for many years. LIDARs have been used to measure wind shear, turbulence and wake vortices in both military and civil applications. Typically, the laser radar system (LIDAR) operates by scattering radiation from natural aerosols (for example, dust, pollen, water droplets, and the like) and measuring the Doppler shift between outgoing and returning radiation. In order to measure wind speed and direction it is usual to scan the LIDAR, typically using a conical scan or multiple fixed beams to allow a wind vector to be intersected at a range of angles, thereby enabling a true (3D) velocity vector to be deduced. Other scanning patterns may also be used to determine the true velocity vector. However, the accuracy of determining the true velocity vector is dependent on knowledge regarding the direction of the LIDAR.

One advantage of LIDAR includes prediction of the potential wind speeds approaching the rotor of the wind turbine. For example, LIDARs may be used for providing wind speed measurements up to 400 m in front or ahead of the rotor of the wind turbine. Accordingly, the LIDAR may provide information regarding approaching wind speeds to a wind turbine controller in advance, thereby increasing the controller's available reaction time and allowing pitch actuation to occur in advance to mitigate wind disturbance effects. The wind turbine controller may use feed-forward control algorithms to improve load mitigation and controller performance.

Currently available LIDARs for use with wind turbines are impacted by surrounding atmospheric conditions and other factors such as blade positions. As oncoming wind approaches a wind turbine, a drop in wind speed is fluidly induced. This wind speed decrease is known as an induction, which when measured at a specific location and normalized to the free-stream wind speed is known as an induction factor. The free-stream wind speed is the speed of the undisturbed natural air flow, usually at hub height. Betz' theory suggests that an optimal wind turbine operating condition to maximize power extraction is at an induction factor of 0.33. More discussion on Betz' theory is available at https://en.wikipedia.org/wiki/Betz%27s_law and is also discussed in Betz, A. (1966) *Introduction to the Theory of Flow Machines*. (D. G. Randall, Trans.) Oxford: Pergamon Press. Because LIDARs have limited range, however, it may not be possible to directly measure the free-stream wind speed at an infinite distance.

SUMMARY OF THE INVENTION

In accordance with aspects of the present specification, a wind turbine is presented. The wind turbine includes a wind turbine rotor and rotor blades mounted on the rotor, at least one sensing device disposed on the wind turbine for measuring a first signal representative of a first wind speed at a first distance from the wind turbine rotor and a second signal representative of a second wind speed at a second distance from the wind turbine rotor. The wind turbine system includes a blade pitch actuator for adjusting a pitch of the rotor blades and a generator controller for adjusting a voltage of a wind turbine generator. The wind turbine system also includes a control unit in communication with the blade pitch actuator and the generator controller, the control unit being used for controlling the wind turbine via the blade pitch actuator and the generator controller based on an induction factor derived from the first and second signals.

In accordance with another aspect of the present specification, a method for controlling a wind turbine is presented. The method for controlling a wind turbine includes receiving a first signal representative of a first wind speed at a first distance from the wind turbine and receiving a second signal representative of a second wind speed at a second distance from the wind turbine. The second distance is different than the first distance. The method includes deriving a free-stream wind speed from the first wind speed, the second wind speed, the first distance and the second distance and deriving an induction factor from the free-stream wind speed and either the first wind speed and/or the second wind speed. The method includes adjusting either a wind turbine blade pitch or a generator voltage to move the induction factor toward a desired operating range.

In accordance with yet another aspect of the present specification, a wind turbine control system is presented. The wind turbine control system includes a control unit which operates the wind turbine at a desired induction factor range and a blade pitch actuator in communication with the control unit. The wind turbine control system includes a generator controller in communication with the control unit and used to adjust a generator voltage. The control unit commands the blade pitch actuator or the generator controller to adjust the blade pitch or the generator voltage, respectively, to bring an operating point of the wind turbine toward the desired induction factor range.

BRIEF DESCRIPTION OF THE DRAWINGS

These and other features and aspects of embodiments of the present invention will become better understood when the following detailed description is read with reference to the accompanying drawings, wherein.

DETAILED DESCRIPTION

Figure 1:
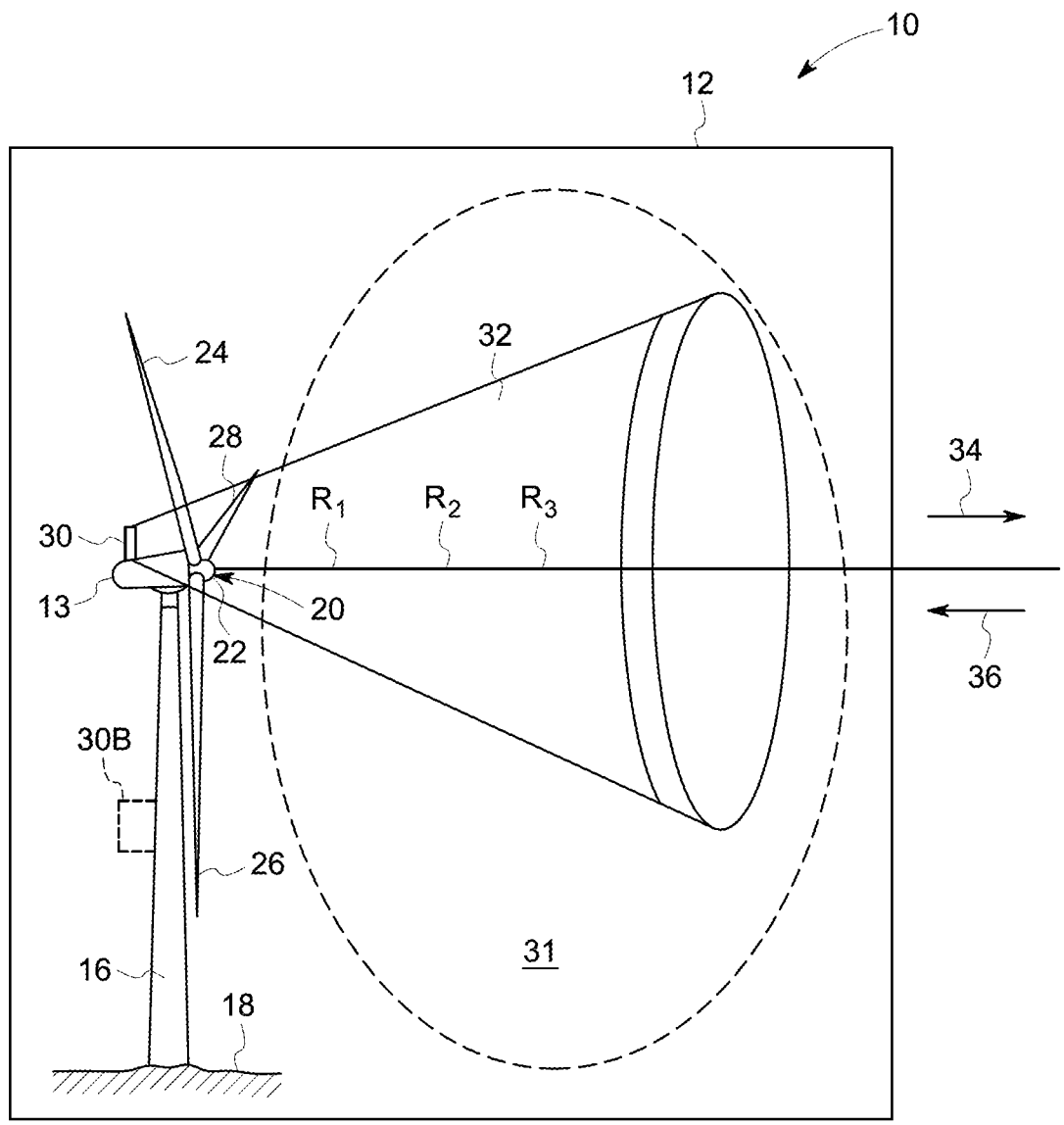
FIG. 1 is a diagrammatic illustration of a wind turbine system for controlling a wind turbine, in accordance with certain aspects of the present specification.

Unless defined otherwise, technical and scientific terms used herein have the same meaning as is commonly understood by one of ordinary skill in the art to which this disclosure belongs. The terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "control system" or "controller" may include either a single component or a plurality of components, which are either active and/or passive and are connected or otherwise coupled together to provide the described function or functions.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "axial" refers to a direction aligned with an axis that passes through a center of a wind turbine rotor, the axis being perpendicular to the plane defined by the swept area of the turbine rotor blades. Further, the term "axial distance" to the wind turbine is the shortest distance from a given location to any point on the plane defined by the swept area of the turbine rotor blades. As used herein, the term "radial" refers to a direction moving outwardly away from the center of a wind turbine rotor in a plane defined by the swept area of the turbine rotor blades. As used herein, the term "circumferential" refers to a direction or directions around (and tangential to) the circumference of the circle defined by the swept area of the turbine rotor blades.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be described in detail hereinafter, various embodiments of systems and methods for controlling a wind turbine are presented. In one embodiment, the system may be representative of a control system used to control a wind turbine. Some examples of such a system include, but are not limited to, sensors, components, control schemes algorithms and electronic controllers. It may be noted that while the present systems and methods are described with reference to a wind turbine, the present systems and methods may also be used with other systems for establishing free-stream wind speeds. Moreover, the systems and methods herein measure oncoming wind speeds and the drop in wind speed approaching a wind turbine. Additionally, the systems and methods according to the embodiments herein provide accurate estimates of potential wind speeds that may impact the wind turbine in the future, and control the wind turbine based on an estimated potential wind speed, and/or oncoming wind speeds for enhanced operation of the wind turbine.

FIG. 1 is a diagrammatic illustration of a wind turbine system 10 for controlling a wind turbine 12, in accordance with certain aspects of the present specification. In one exemplary embodiment, the wind turbine system 10 includes the wind turbine 12 and a processing subsystem (not shown) operatively coupled to the wind turbine 12. In this embodiment, the wind turbine 12 is a horizontal-axis wind turbine. Alternatively, the wind turbine 12 may be a vertical-axis wind turbine.

The wind turbine 12 includes a tower 16 that extends from a support system 18, a nacelle 13 mounted on the tower 16, and a rotor 20 that is coupled to the nacelle 13. The rotor 20 includes a rotatable hub 22 and one or more rotor blades 24, 26, 28 coupled to and extending outward from the hub 22. In a presently contemplated configuration, the rotor 20 has three rotor blades 24, 26, 28. In an alternative embodiment, the rotor 20 includes more or less than three rotor blades 24, 26, 28. The rotor blades 24, 26, 28 can be made of a non-conductive material. By way of a non-limiting example, the rotor blades 24, 26, 28 of the wind turbine 12 are made of a non-conductive composite material, such as, but not limited to, fiber glass. In addition, the rotor blades 24, 26, 28 may also be coated with a conductive or a non-conductive material. The rotor blades 24, 26, 28 are arranged around the hub 22. The rotor blades 24, 26, 28 are mated to the hub 22 by coupling a root of a blade to the hub 22.

The wind turbine system 10 further includes a LIDAR based sensing device 30 disposed on or about the wind turbine 12. For example, the LIDAR based sensing device 30 may be disposed on or inside one or more of the nacelle 13, the hub 22, the rotor 20, and/or at the bottom of or on the tower 16. In the presently contemplated configuration of FIG. 1, the LIDAR based sensing device 30 is located on the nacelle 13. The LIDAR based sensing device 30, for example, may be any one of or a combination of a pulsed LIDAR, a continuous LIDAR, a Doppler pulsed LIDAR, or a Non-Doppler wind speed remote sensing device. The LIDAR based sensing device 30, for example, scans area 31 in the vicinity of the wind turbine 12. The LIDAR based sensing device 30 may scan the area 31 using a laser scan pattern 32. The laser scan pattern 32 may be of different shapes. In the embodiment of FIG. 1, the laser scan pattern 32 is conical. In some embodiments, the rotor disc may tilt upward as much as 15 degrees.

Furthermore, the LIDAR based sensing device 30 measures oncoming wind speeds approaching at least a portion of the wind turbine 12 using the scan of the area 31. The LIDAR based sensing device 30, for example, may measure the oncoming wind speeds at a plurality of range locations. As used herein, the term "range location" refers to a position at a determined distance in front of the wind turbine 12 corresponding to which the LIDAR based sensing device 30 measures an oncoming wind speed. For example, the range locations may be locations at a distance of, but not limited to, 50 meters, 100 meters, 200 meters, and the like, upstream from the plane of the rotor 20.

An oncoming wind speed corresponding to a range location is hereinafter referred to as a "range wind speed." Accordingly, the oncoming wind speeds at the plurality of range locations include a plurality of range wind speeds corresponding to the plurality of the range locations. For example, in the presently contemplated configuration, the LIDAR based sensing device 30 measures oncoming wind speeds or range wind speeds $RW_1$, $RW_2$, $RW_3$ at range locations $R_1$, $R_2$, and $R_3$, respectively. In another example, the oncoming wind speeds may include multiple range wind speeds at each of the range locations, in instances where the wind speed at any given location is changing as a function of time. It may be noted that for ease of illustration, the example of FIG. 1 depicts a single range wind speed $RW_1$, $RW_2$, $RW_3$, corresponding to each range location $R_1$, $R_2$, and $R_3$, respectively.

Additionally, the LIDAR based sensing device 30 is configured to generate signals 34 representative of the measured oncoming wind speeds. The LIDAR based sensing device 30 is further configured to transmit pulsed energy beam signals 34 (such as laser pulsed beams, hereinafter "signals") representative of the oncoming wind speeds to the processing subsystem (not shown). A reflected portion 36 of the signals 34 gets reflected back to the LIDAR based sensing device 30 when scattered by natural aerosols (for example, dust, pollen, water droplets, and the like). The remainder of the signals 34 continues to carry forward. The reflected portions 36 of the signals 34 that are reflected back from a shorter distance are associated with a shorter time-of-flight (TOF) than those reflected back at a greater distance. As such, a LIDAR based sensing device 30 can measure wind speeds at multiple distances simultaneously.

In addition to the LIDAR based sensing device 30, the wind turbine 12 may include one or more devices (not shown) that are configured to measure information related to the wind turbine 12. These devices, for example, may be disposed on or inside the wind turbine 12. The information, for example, may include blade positions of the blades 24, 26, 28, yaw position of the nacelle 13, and the like. The blade positions of the blades 24, 26, 28, for example may include blade azimuthal and/or pitch positions of blades 24, 26, 28. These devices include memory storage devices and other electronic controllers used to the store wind turbine data and control the wind turbine 12.

Figure 2:
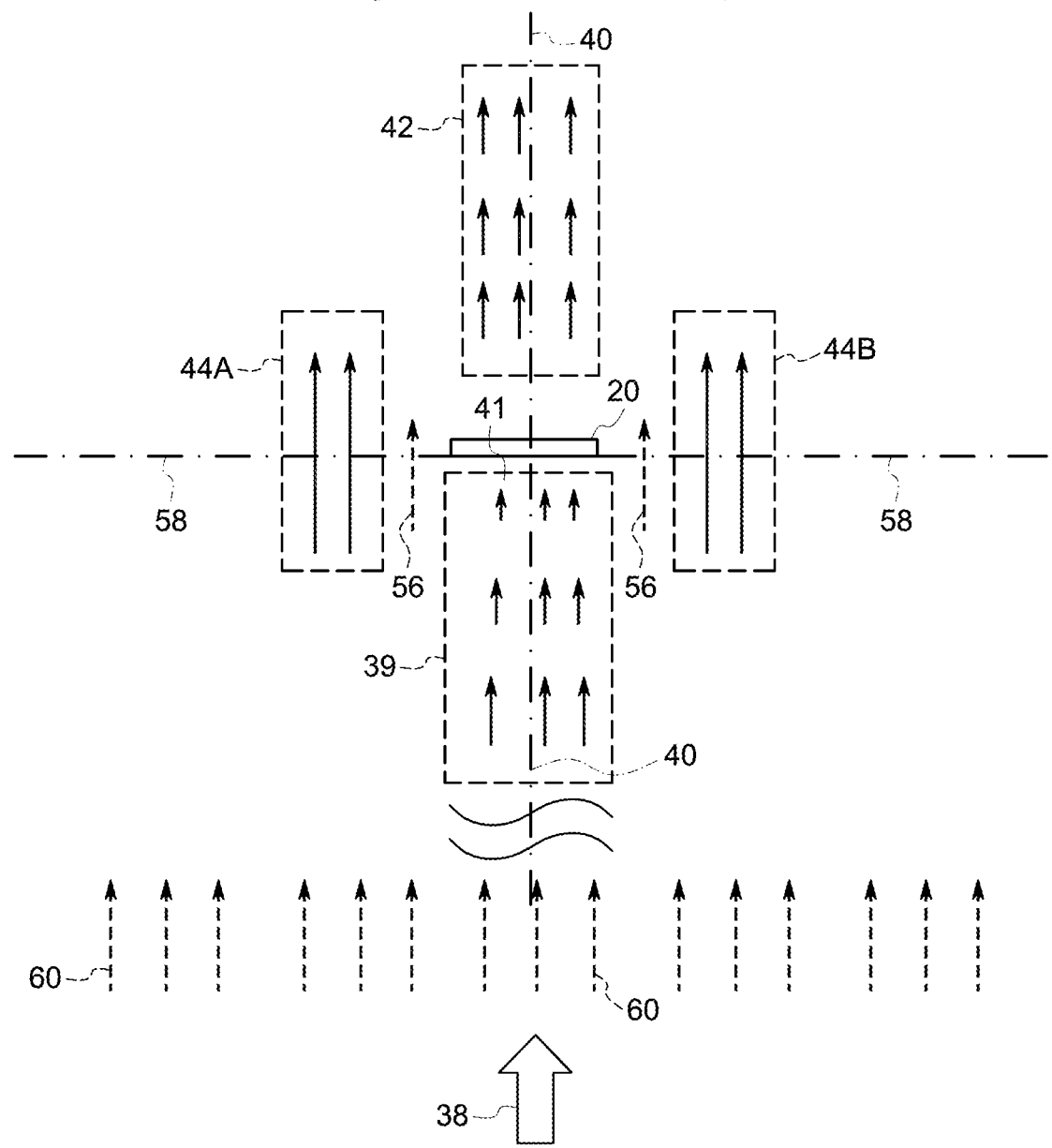
FIG. 2 is a top view of a wind turbine illustrating a simulation of the far field induction flow details of a single rotor.

FIG. 2 is a top view illustrating a simulation of the far field induction flow details of a single rotor. The far field induction flow details describe the drop in wind speed (or increase as the case may be) from a free-stream wind speed 60 as air approaches the wind turbine 12, at distances upstream of the wind turbine 12. As used herein, the free-stream wind speed 60 of a given wind turbine 12 is the wind speed at a location upstream of the wind turbine 12 at which the wind turbine 12, as an obstruction in the wind stream, is not inducing a change in the wind speed. The free-stream wind speed 60 therefore will likely exist at multiple locations at once, both at a nearest free-stream wind speed location, as well as at location upstream of the nearest free-stream wind speed location. The lengths of the thin arrows in FIG. 2 are proportional to the windspeeds in each area. The arrow 38 at the bottom of FIG. 2 represents the wind direction. As the wind approaches the single rotor along center axis 40, the wind speed decreases from a free-stream wind speed 60 prior to arriving at the hub area 41 of the single rotor. As viewed in the portion at the top of FIG. 2, the windspeed is noticeably decreased in the downstream area 42, as kinetic energy from the wind is transferred to rotational energy of the single rotor. The windspeed is also noticeably decreased in an upstream induction area 39, even before arriving at the hub area 41. The simulation was run assuming a windspeed of 5 m/s at a distance of infinity. For the windspeed to be maintained at an average windspeed of 5 m/s across the field, areas of increased wind velocity 44A and 44B are required to offset the decreased windspeed in the downstream area 42. Stated otherwise, areas of increased wind velocity 44A and 44B form on their own, concurrent with the formation of decreased wind velocity in the downstream area 42, and the induction area 39, to satisfy conservation of mass and continuity. The areas of increased wind velocity 44A and 44B are located just downstream of the location of the hub area 41 and offset to the right and left of the downstream area, as viewed from the perspective of the wind direction at the location of arrow 38. Simulations at free-stream windspeeds other than 5 m/s show substantially similar characteristics. The arrows shown in the downstream area 42, the induction area 39, and the areas of increased wind velocity 44A and 44B are all sized so as to qualitatively represent relative wind velocities. For example, in the induction area 39, the arrows get smaller the closer they are to the rotor 20, indicative of the slowing windspeed in that region.

Figure 3:
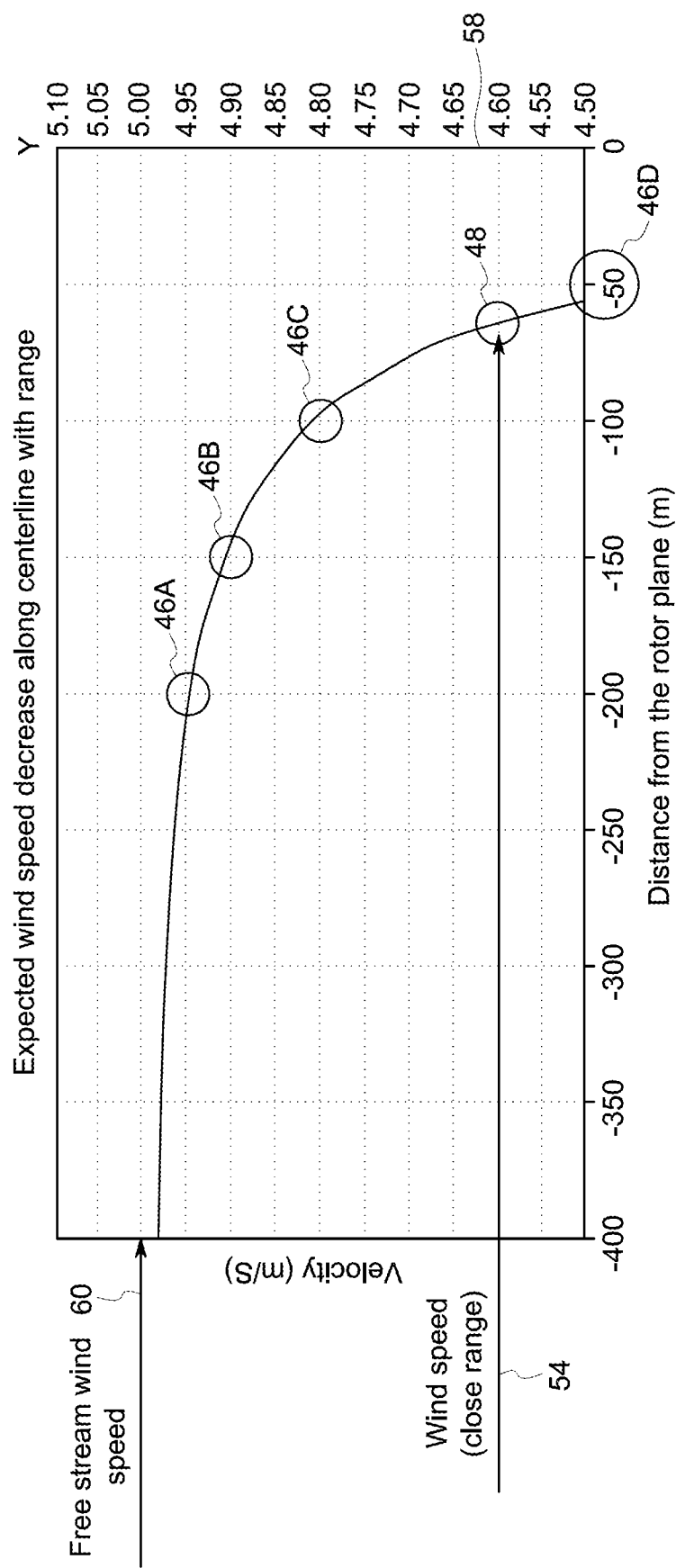
FIG. 3 is a diagrammatic illustration of wind velocity plotted against the distance from a wind turbine rotor plane.

Referring now to FIG. 3, the wind velocity is plotted on the y-axis versus the exemplary distance from the rotor plane 58 on the x-axis. As shown in FIG. 3, as the distance to the rotor plane 58 changes from 0 to 200 m upstream, and eventually to 400 m upstream, the wind speed increases asymptotically toward 5 m/s. Similarly, as the distance to the rotor plane 58 changes from 400 m upstream to 200 m upstream, the wind speed decrease by less than 1% from less than 5 m/s down to about 4.95 m/s. From a distance of 200 m upstream to 100 m upstream of the rotor plane 58, the wind speed decreases more dramatically from 4.95 m/s to about 4.81 m/s. In addition, from a distance of 100 m upstream to 50 m upstream of the rotor plane 58, the wind speed decreases even more dramatically from about 4.81 m/s to well below 4.5 m/s.

The characteristic relationship between windspeed and distance from the rotor plane 58 can be defined for any wind turbine 12 in connection with windspeed measurements (or range wind speed). For example, at locations 46A-46D which are 200 m, 150 m, 100 m and 50 m upstream from the rotor plane 58 respectively, the LIDAR based sensing device 30 can take windspeed measurements to define the characteristic relationship between windspeed and distance from the rotor plane 58. The curve can be extended asymptotically to a sufficiently large distance because wind speed measurements at locations 46A-46D are capturing the locations of the most dramatic windspeed changes (i.e., the drop in wind speed increases in magnitude as the wind approaches the rotor plane 58). Using such an approach, at a sufficiently large distance, the speed of the undisturbed natural air flow (i.e., the free-stream wind speed 60) can be approximated within an error of less than 1%. As discussed below, the free-stream wind speed 60 does not occur at a fixed location but instead changes with changing wind conditions.

Still referring to FIG. 2, this approach is an improvement over using a nacelle-based anemometer to estimate the free-stream wind speed 60 because the air entering a nacelle-based cup anemometer has already decelerated by the time it has reached the anemometer and there is a relatively large uncertainty in quantifying the deceleration from the free-stream wind speed 60. A location at which the free-stream wind speed 60 occurs changes with changing wind and wind turbine operating conditions. The operating conditions of the wind turbine as well as the wind conditions may both affect the location at which the free-stream wind speed 60 occurs. In some conditions, the location at which the free-stream wind speed 60 occurs may be a closer or farther axial distance from the wind turbine than at other conditions. As shown in FIG. 2 and FIG. 3, the free-stream wind speed 60 occurs at a location upstream from the rotor plane 58. The FIG. 2 illustration is a schematic representation, not drawn to scale.

The locations 46A-46D shown in FIG. 3 can be selected by measuring the relative magnitudes of the induction. The locations 46A-46D may all physically be axially upstream of wind turbine 12 along the center axis 40 (shown in FIG. 2), and are graphically represented in FIG. 3 showing expected wind speed decrease as a function of the distance from the rotor plane. In the example shown in FIG. 3, the induction (i.e., drop in wind speed) at the first location 46A is about 1% of the free-stream wind speed 60, which is represented in FIG. 3 where the slope of the curve levels off at a distance of 400 m or greater. The induction at the second location 46B is about 2% of the free-stream wind speed 60, or roughly double the induction at the first location 46A. The induction at the third location 46C is about 4% of the free-stream wind speed 60 or about double the induction at the second location 46B, and roughly quadruple the induction at the first location. The induction at the fourth location 46D is about 13% of the free-stream wind speed 60 or greater than or equal to about 3 times the induction at the third location 46C. The first through the fourth locations 46A-46D may be evenly spaced or may be spaced to adequately capture the change in induction as the wind approaches the wind turbine 12.

As illustrated in the example shown in FIG. 3, the magnitude of the induction is not linear with the distance to the y-axis representing the rotor plane 58. The above approximations illustrate the asymptotic nature of the induction as a function of the distance to the rotor plane 58. In addition, other preferred embodiments of the present disclosure may have more or less than four measurement locations 46A-46D. For example, other wind turbine installations may use 1, 2, 3, 5, 6, 7, 8, 9, 10 or more locations for measuring the induction.

In a n embodiment with two measurement locations, a first signal representative of a first wind speed at a first distance from the wind turbine 12 (location 46A, for example) and a second signal representative of a second wind speed at a second distance from the wind turbine 12 (location 46B, 46C, or 46D, for example) could be used to derive the asymptotic characteristic shown in FIG. 3 and thus the free-stream wind speed 60. Three measurement locations, four measurement locations and greater numbers of measurement locations could similarly be used to define the asymptotic characteristic shown in FIG. 3 and free-stream wind speed 60.

Still referring to FIG. 3, the free-stream wind speed 60 can be established along with a close-range wind speed 54 representative of the wind speed at an induction location 48 closer to or at the turbine rotor plane 58. The free-stream wind speed 60 is the speed of the undisturbed natural air flow. Stated otherwise, the free-stream wind speed 60 is the speed of the wind a great enough distance upstream of the wind turbine so as to be free from and unaffected by any induction effects. The decrease in wind speed between the free-stream wind speed 60 and the close-range wind speed ($WS_{CR}$) 54 is fluidly induced. The magnitude of the decrease is known as an induction. An induction factor 62 (FIGS. 4, 7 and 8) which is normalized for the magnitude of the windspeed, is defined as the free-stream wind speed 60 ($WS_{FR}$) minus the close-range wind speed 54 ($WS_{CR}$) divided by the free-stream wind speed 60 ($WS_{FR}$), or ($WS_{FR}-WS_{CR}$)/$WS_{FR}$. Stated otherwise, the induction factor 62 is the windspeed drop from the free-stream wind speed 60 to the wind speed at the induction location 48, on a percent or fractional basis. The induction factor 62 is proportional to the amount of energy the wind turbine 12 is extracting from the wind.

The induction location 48 may vary so as to be at various distances upstream of the rotor plane 58, including a distance of zero (in which case the induction location 48 is at the rotor plane 58). The induction location 48 may be located about half the rotor diameter upstream of the rotor plane 58. In other embodiments, the induction location 48 may be a set distance upstream of the rotor plane 58, such as but not limited to 0 m, 5 m, 10 m, 20 m, 30 m, 40 m, 50 m, 60 m, 70 m, 80 m, etc. In other embodiments, the induction location 48 may be located at a different location that is understood to be representative of a desired location for the purpose of defining a characteristic and/or suitable induction factor 62. In other embodiments, the induction location 48 may be defined based on factors such as but not limited to a height above the ground, transverse windspeed, ambient conditions, variations in the surrounding terrain, and/or obstructions in the vicinity of the wind turbine system 10. As illustrated by the induction area 39 in FIG. 2 as well as by the and drop in wind speed approaching a rotor plane 58 as shown in FIG. 3, induction occurs across and through a large area, and not just at the induction location 48. However, having a single induction location 48 or alternatively a defined set of parameters that define an induction location 48 may yield more accurate estimations of the free-stream wind speed 60 compared to randomly selecting a location within the induction area 39. In a preferred embodiment and as used herein, the induction location 48 is at the rotor plane 58. As such, the induction factor, as defined herein, is the (free-stream wind speed 60 ($WS_{FR}$) minus the wind speed at the rotor plane 58) divided by the free-stream wind speed 60 ($WS_{FR}$).

The relationship between the induction factor 62, the free-stream wind speed 60 and a close-range wind speed (WScr) 54 is given by the following equation:

$$WScr=WS_{FR}*(1-ind*(1+(x/sqrt(x^2+r^2)))),$$

Where:
WScr is the close-range wind speed 54,
$WS_{FR}$ is the free-stream wind speed 60,
ind is the induction factor 62,
x is the axial distance from the close-range location to the wind turbine rotor plane 58, and
r is the radius of the wind turbine rotor 20 (i.e., the swept radius of the wind turbine blades 24, 26, 28).
It is noted that at locations upstream of the wind turbine 12, the parameter x is taken to be a negative value, consistent with the x-axis values in FIG. 3. For example, at 50 m upstream of the rotor plane 58, x=−50. In addition, "x" and "r" can be in whatever distance units are desired, as long as they're in the same distance units. Similarly, $WS_{FR}$ and WScr can be in whatever wind speed units are desired, as long as they are in the same units of wind speed. In this equation, the unknowns would generally be the induction factor 62 and the free-stream wind speed 60. The value of x, (the axial distance from the close-range location to the wind turbine rotor plane 58) and the value of WScr (the close-range wind speed 54), can be measured via the LIDAR based sensing device 30, as discussed above. Plugging the rotor radius, r, close range wind speed 54 and the axial distance from the close-range location to the wind turbine rotor plane 58 (i.e., "x") into the equation (for each independent measurement of the several [LIDAR] measurements corresponding to several range locations) yields a correlation between induction factor and free-stream wind speed. A least-squares regression is then performed on the collection of measurements, taken at different ranges, resulting in a best-fit correlation between induction factor and free-stream wind speed. When combined with the characteristic shown in FIG. 3 (which is constructed from the same set of measurements as those used in the equation above), free-stream wind speed 60 is accurately approximated, as well as the induction factor 62. Other models of induction besides that represented in the equation above may be used in the regression as well.

Referring to FIG. 2, the areas of increased wind velocity 44A and 44B may also be used to approximate the free-stream wind speed 60 ($WS_{FS}$), as well as the induction. The wind speed within the areas of increased wind velocity 44A and 44B may be approximated using a LIDAR based sensing device 30, as described above. For example, the larger the magnitude of the induction (i.e., decrease in wind speed at and upstream of the turbine rotor plane 58), the larger the increase in velocity observed in the areas of increased wind velocity 44A and 44B, for any given free-stream wind speed 60. However, an increase in free-stream wind speed 60 or long-range wind speed ($WS_{LR}$) 52 will also result in an increase in the observed velocity in the areas of increased wind velocity 44A and 44B. Therefore, an additional parameter is needed to differentiate if an increase in the observed velocity in the areas of increased wind velocity 44A and 44B is attributable to increased induction or increased free-stream wind speed 60/long-range wind speed ($WS_{LR}$) 52.

Referring still to FIG. 2, proximal free-stream regions 56 form proximate to the turbine rotor plane 58 substantially between the upstream induction area 39 and the areas of increased wind velocity 44A and 44B. Velocity gradients form between these two areas. In order for the wind speed to change from a decreased wind speed in the upstream induction area 39 to an increased wind speed in the areas of increased wind velocity 44A and 44B, it must pass through a region or regions that are both representative of the free-stream wind velocity and in the vicinity of the hub area 41. These regions are the proximal free-stream regions 56. By using a LIDAR as described above to estimate the wind velocity within the proximal free-stream regions 56 and comparing the resulting measurements to wind speeds in the areas of increased wind velocity 44A and 44B, it is possible to attribute an increase in the observed velocity in the areas of increased wind velocity 44A and 44B to either increased induction or increased free-stream wind speed 60 as the case may be, depending on whether or not there is an increase in the wind speed in the proximal free-stream regions 56.

Using the areas of increased wind velocity 44A and 44B and the proximal free-stream regions 56 provides a second method of approximating both the free-stream wind speed ($WS_{FS}$) 60 and the induction, in addition to the first method described above and illustrated in FIG. 3, which uses the wind speed measurements at locations 46A-46D and the induction location 48, which as discussed above is at the rotor plane 58 in a preferred embodiment. Using both methodologies in connection with each other has multiple potential benefits. Having two independent approximations of both the induction factor 62 and the free-stream wind speed 60 acts as a data and calculation confirmation. If the two independent sets of approximations are within a defined uncertainty band (for example 0.2%, 0.5%, 1%, 2%, 3%, 5%, 10%, etc.) the measurements can be taken as confirmed and accurate. If the second method (i.e., using the areas of increased wind velocity 44A and 44B and the proximal free-stream regions 56) yields a higher approximation of induction and free-stream wind speed 60 than the first method, it may be an indication that there is increased or changing transverse wind speed. As used herein, a transverse wind speed is the speed of a component of the wind in a direction orthogonal to the axial direction. If the second method (i.e., using the areas of increased wind velocity 44A and 44B and the proximal free-stream regions 56) yields a lower approximation of induction and free-stream wind speed 60 than the first method, it may be an indication that that there is a measurement error. Other benefits of combining the measurements from both of the two independent measurement sets are also possible.

Because LIDAR based sensing devices 30 use time-of-flight (TOF) calculations to establish wind speed, it may be necessary for the LIDAR based sensing device 30 that is used to measure the areas of increased wind velocity 44A and 44B and the proximal free-stream regions 56 to be calibrated to a different range from a LIDAR based sensing device 30 that is used to measure the windspeed at upstream locations 46A-46D and the induction location 48, which may be further away, or as discussed above, at the rotor plane 58 in a preferred embodiment. Stated otherwise, because both the areas of increased wind velocity 44A and 44B and the proximal free-stream regions 56 are relatively closer to the hub area 41, a nacelle-mounter LIDAR based sensing device 30 used to measure the wind speed in these areas may need to be calibrated to a shorter range, in order to yield accurate measurements.

Figure 4:
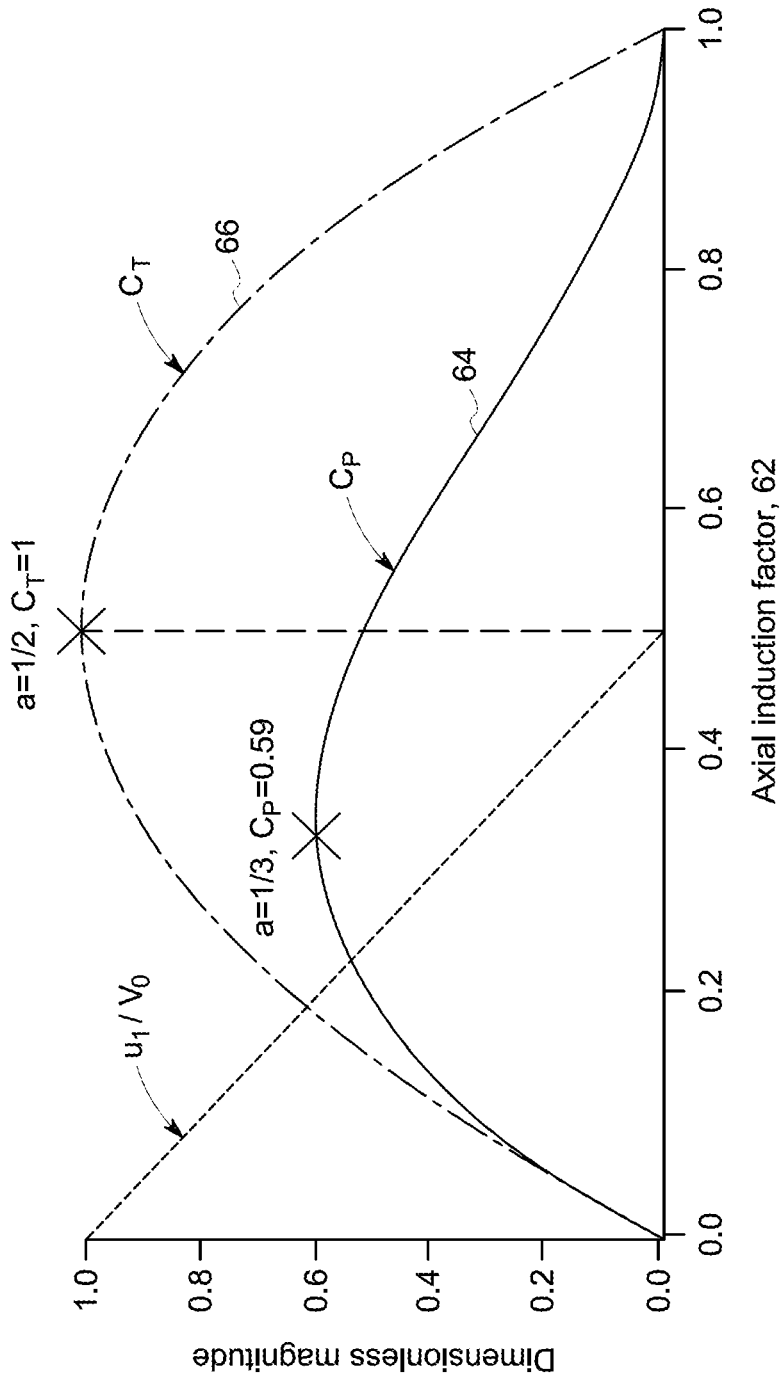
FIG. 4 is a diagrammatic illustration of the relationships between the coefficient of power $C_P$, the coefficient of thrust $C_T$, and induction factor.

FIG. 4 illustrates the theoretical relationship between a coefficient of power $C_P$ 64 and induction factor 62. The coefficient of power $C_P$ 64 is a measure of the amount of energy being extracted from the wind in relation to the maximum amount of extractable energy, based on the wind speed. As shown in FIG. 4, the maximum amount of extractable energy is 59% of the energy of the wind, yielding a $C_P$ 64 of 0.59. It is not possible to extract all of the energy from the wind because the wind would then have zero velocity and the air would stop, leaving the wind behind it nowhere to go. Therefore, it's necessary for the wind to blow past the wind turbine, giving up a portion of its energy in the process. As shown in FIG. 4, the maximum theoretical $C_P$ 64 of 0.59 occurs at an induction factor 62 of ⅓ or 0.33. The relationship between the coefficient of power $C_P$ 64 and induction factor 62 is as follows: $C_p = 4 \times ind \times (1-ind)^2$, where "ind" is the induction factor 62.

FIG. 4 also illustrates the theoretical relationship between a coefficient of thrust $C_T$ 66 and induction factor 62. The coefficient of thrust $C_T$ 66 is a measure of the amount thrust or force being exerted on the wind turbine 12 in relation to the maximum possible amount of thrust, based on the wind speed. As shown in FIG. 4, the maximum possible amount of thrust, 100%, occurs at an induction factor 62 of ½ or 0.5. The relationship between the coefficient of thrust $C_T$ 66 and induction factor 62 is as follows: $C_t = 4 \times ind \times (1-ind)$, where "ind" is the induction factor 62.

Figure 5:
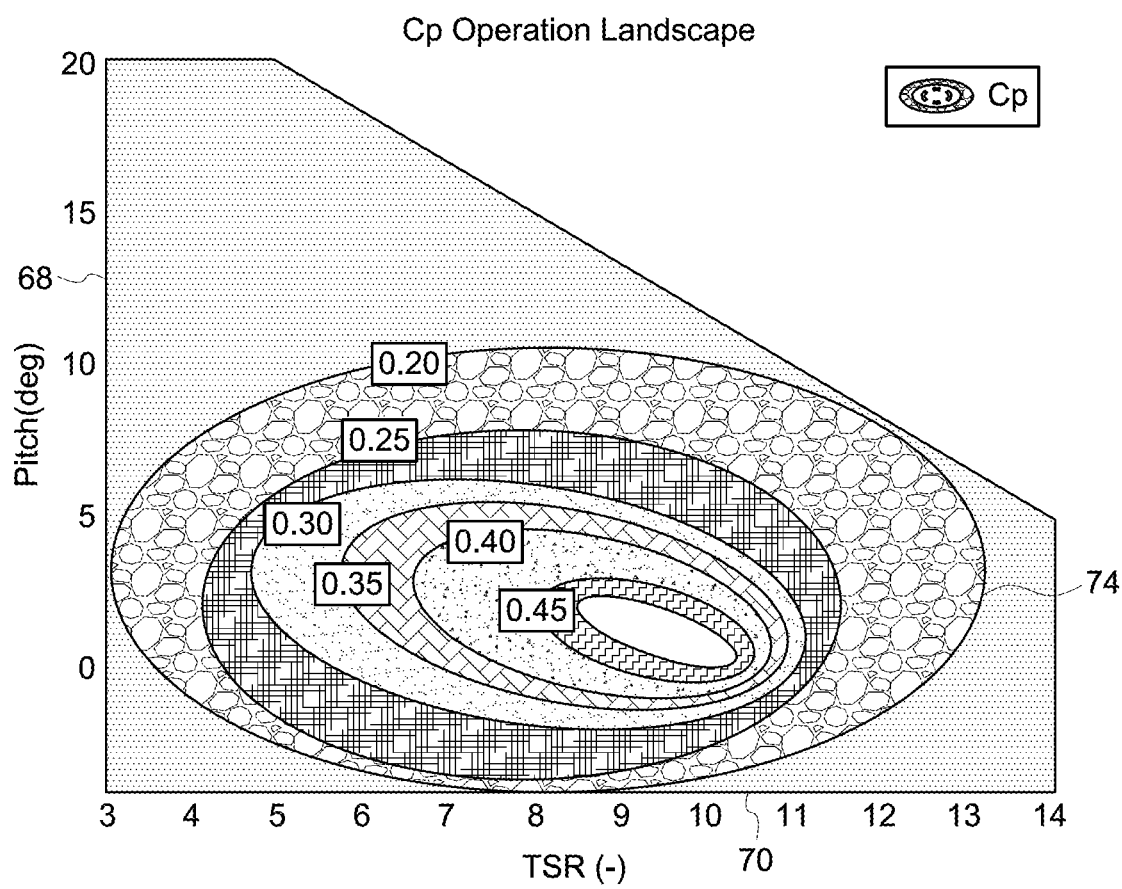
FIG. 5 is a diagrammatic illustration of a coefficient of power $C_P$ aeromap.

FIG. 5 is a map or landscape illustration $C_P$ 64 operation. On the y-axis is wind turbine blade pitch 68 (or angle) in degrees ranging from −5 to 20 degrees. On the x-axis is Tip Speed Ratio, TSR 70 a dimensionless parameter that is the ratio of the turbine blade tangential tip speed 72 to the free-stream wind speed 60. Plotted on the map are contour lines 74 representative of constant values of the coefficient of power $C_P$ 64. The contour lines 74 or "efficiency islands" illustrate the optimal operational locations on the map. For example, moving toward the region of the map where there are smaller efficiency islands will result in the wind turbine 12 will be very close to the ideal operational point. On the other hand, in the region of the map where $C_P$=0.15, the wind turbine 12 will be extracting a greatly reduced amount of power from the wind when compared to the maximum possible amount. The map illustrated in FIG. 5 can change with changing ambient conditions, and will also vary from one wind turbine 12 installation to the next. Moreover, gathering the data to assemble such a map is a time-consuming and expensive endeavor.

Still referring to FIG. 5, the wind turbine 12 can be controlled or operated to the maximum possible coefficient of power $C_P$ 64 by adjusting the blade pitch 68 or by adjusting the TSR 70. The TSR 70 can be adjusted by increasing or decreasing a torque on the blades 24, 26, 28 via a nacelle-mounted generator (not shown). As wind blows past the wind turbine 12, the turbine blades 24, 26, 28 spin a generator which in turn produces electrical power. By increasing the voltage output at which the generator is producing power, the resistive force is increased, making it harder to spin the generator and increasing the rotational inertia necessary to spin the turbine blades 24, 26, 28. The result is the rotational speed of the turbine blades 24, 26, 28 is reduced which in turn reduces the TSR 70. Similarly, reducing the generator voltage output will serve to speed up the rotational speed of the turbine blades 24, 26, 28 which in turn will serve to increase the TSR 70. Because the rotational speeds of both the generator and turbine blades 24, 26, 28 are known, as well as the diameter of the turbine rotor 20, a tangential tip speed of the turbine blades 24, 26, 28 (i.e., the numerator of TSR 70) can be calculated directly and precisely. On the other hand, nacelle-mounted cup anemometers that are used to approximate the free-stream wind speed 60 (i.e., the denominator of TSR 70) have inherent inaccuracies due to the wind speed decrease that is induced by the time it arrives at the nacelle-mounted cup anemometers. In contrast, using a nacelle-mounter LIDAR based sensing device 30, as described above, entails measuring wind speed at locations upstream of the turbine rotor plane 58 that accounts for variations in the induced wind speed or induction as the wind approaches the wind turbine 12. Therefore, the above-described methodologies utilizing a nacelle-mounter LIDAR based sensing device 30 result in a more accurate 1) measure of free-stream wind speed 60, 2) calculation of TSR 70, and 3) control of the wind turbine 12.

Figure 6:
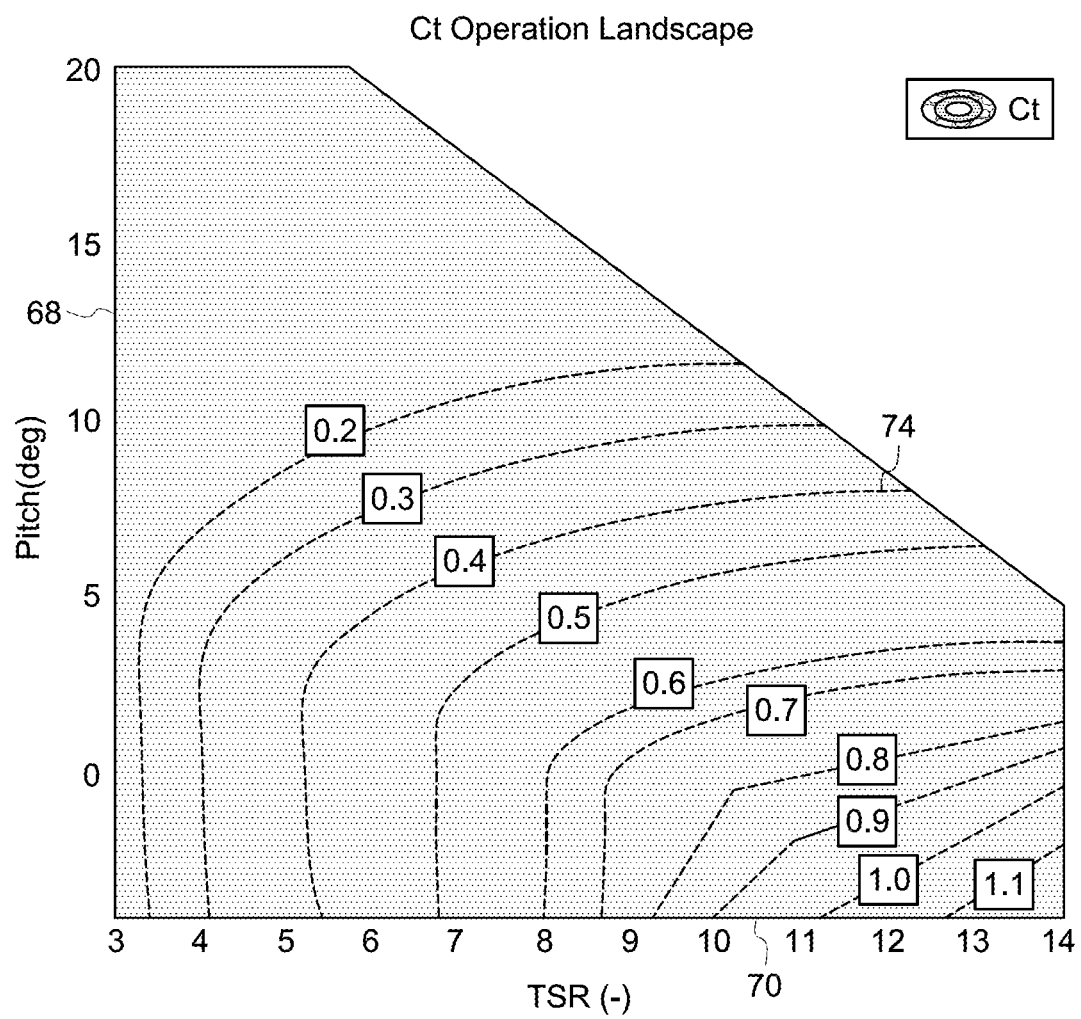
FIG. 6 is a diagrammatic illustration of a coefficient of thrust $C_T$ aeromap.

FIG. 6 is a map or landscape illustration $C_T$ 66 operation. On the y-axis is wind turbine blade pitch 68 (or angle) in degrees ranging from −5 to 20 degrees. On the x-axis is Tip Speed Ratio (TSR) 70 a dimensionless parameter that is the ratio of the turbine blade tangential tip speed to the free-stream wind speed 60, ranging from 3 to 14. Plotted on the map are contour lines 74 representative of constant values of the coefficient of thrust $C_T$ 66. The contour lines 74 generally illustrate the coefficient of thrust $C_T$ 66 to be increasing with increasing TSR 70 (i.e., the faster the wind causes the wind turbine 12 to spin, the more thrust that is exerted on the wind turbine 12). The contour lines 74 also generally illustrate the coefficient of thrust $C_T$ 66 to be increasing with a decreasing blade pitch 68. As the blade pitch 68 approaches 0 and even negative angles, the coefficient of thrust $C_T$ 66 increases because a larger cross-section of the blade 24, 26, 28 is orthogonal (or exposed) to the direction of the wind increase the effective surface of the turbine blade 24, 26, 28 on which the wind can act. Any wind turbine system 10 is designed so as to accommodate a maximum coefficient of thrust $C_T$ 66. Therefore, the wind turbine 12 must be controlled by adjusting the blade pitch 68 and TSR 70 as described in the paragraphs above so as to avoid exceeding the maximum allowable coefficient of thrust $C_T$ 66 which occurs at or toward the lower right portion of FIG. 6.

Figure 7:
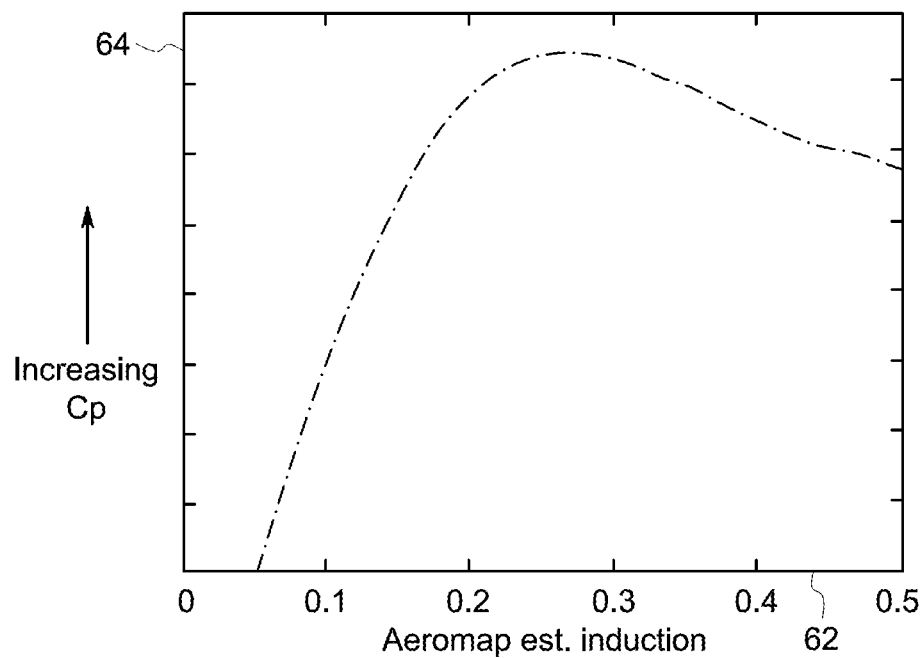
FIG. 7 is a diagrammatic illustration of the relationship between the coefficient of power $C_P$ and induction factor.

FIG. 7 illustrates the relationship between the coefficient of power $C_P$ 64 and induction factor 62, in practice, as approximated from the landscape or "aeromap" illustrated in FIG. 5. As used herein, the term "aeromap" is used to mean an operation map, and illustrates aerodynamic characteristics of the wind turbine 12 such as coefficient of power $C_P$ 64 and coefficient of thrust $C_T$ 66, as a function of the blade pitch angle 68 and TSR 70. As illustrated in FIG. 7, the coefficient of power $C_P$ increases substantially linearly as the induction factor 62 increases from 0.05 to 0.20, at which point the coefficient of power $C_P$ 64 begins to taper, reaching a peak value at an induction factor 62 of between about 0.27 and about 0.29. When compared to FIG. 4, which shows a theoretical relationship between coefficient of power $C_P$ 64 and induction factor 62 peaking at an induction factor 62 of 0.33, FIG. 7 illustrates that the actual coefficient of power $C_P$ 64 peaks at a lower induction factor 62. Therefore, in a preferred embodiment, the peak coefficient of power $C_P$ 64 of the present claimed embodiments occurs at an induction factor 62 below 0.33. More preferably, the peak coefficient of power $C_P$ 64 of the present claimed embodiments occurs at an induction factor 62 below 0.30. Even, more preferably, the peak coefficient of power $C_P$ 64 of the present claimed embodiments occurs at an induction factor 62 between about 0.27 and 0.29.

Figure 8:
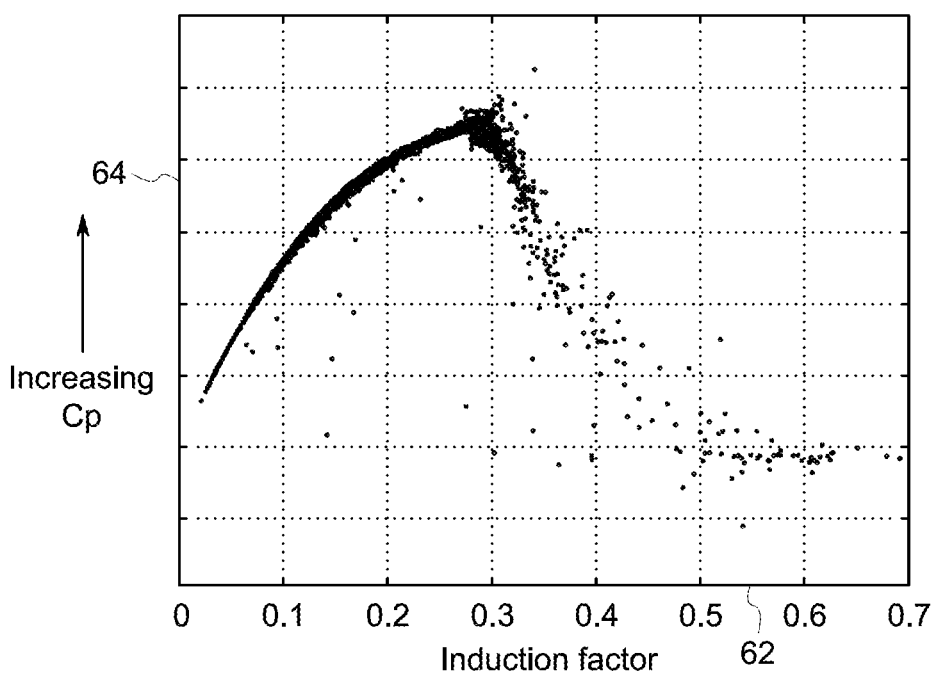
FIG. 8 is a diagrammatic illustration of the relationship between the coefficient of power $C_P$ and induction factor using measured test data.

FIG. 8 illustrates the relationship between the coefficient of power $C_P$ 64 and induction factor 62, as measured with actual test data. The relationship illustrated in FIG. 8 confirms the characteristic of FIG. 7, namely that the peak coefficient of power $C_P$ 64 occurs at an induction factor 62 below 0.33 and even below 0.30, at an induction factor from about 0.27 to about 0.29.

FIGS. 7 and 8 illustrate that a wind turbine 12 can be controlled to yield the highest coefficient of power $C_P$ 64 (and thus the highest extractable power for a given wind speed) by operating the wind turbine 12 at an induction factor 62 between about 0.27 and about 0.29. Because the induction factor 62 can be accurately measured directly using the methodologies described above, the control map or schedule for a wind turbine 12 can be simplified from the exemplary wind turbine aeromap illustrated in FIG. 5. Stated otherwise, instead of continuously adjusting the pitch 68 and TSR 70 to be on the operating point of the wind turbine 12 to the highest efficiency island illustrated in FIG. 5, (which itself is difficult to derive), the wind turbine 12 can simply be controlled to operate at an induction factor 62 between about 0.27 and about 0.29. It is understood that the optimal operational induction factor 62 for a given wind turbine 12 installation may vary based on a number of factors as discussed above, especially given that how an induction factor 62 is itself defined may be the result of experimentation and/or modeling and simulation. In other enhanced control systems according to the present embodiments, the region of FIG. 8 in which the coefficient of power $C_P$ 64 "peaks," may appear as flatter (i.e., more like a "plateau") such that there is a negligible change in coefficient of power $C_P$ 64 between induction factors 62 between about 0.25 and 0.30. In still other enhanced control systems according to the present embodiments, the coefficient of power $C_P$ 64 reaches a maximum value and/or "plateaus" such that there is no significant change in coefficient of power $C_P$ 64 between induction factors 62 between about 0.20 and 0.33. Other enhanced induction factor 62 operating ranges are also possible, depending on the several factors above. The numerical values of various induction factors 62 are based on an induction factor 62 derived by subtracting the wind speed at the rotor plane 58 from the free-stream wind speed 60, and dividing the resulting difference by the free-stream wind speed 60, as discussed above.

Controlling a wind turbine 12 to operate at an induction factor 62 ((as defined above based on free-stream wind speed 60 and close-range wind speed 54, at the rotor plane 58 in a preferred embodiment) has the benefit of accommodating the actual, real-time operation of the wind turbine 12. For example, the extent to which factors such as wind speed, wind direction, ambient conditions as well as other condition-based factors like wind turbine efficiency, cleanliness, wind turbine fouling, turbine blade 24, 26, 28 damage or deterioration, etc., have an impact on the operation and production of the wind turbine 12, these impacts will be reflected in the induction factor 62. For example, if any of the factors above are causing the wind turbine 12 to operate in a deteriorated fashion, the induction factor 62 will be impacted because the wind turbine 12 will be extracting less energy out of the wind, thereby resulting in a decrease in wind speed (as the wind passes the wind turbine 12) that is lower in magnitude. Stated otherwise, if a deteriorated wind turbine 12 extracts less energy from the wind compared to a new wind turbine 12, the change will "show up" in the calculated induction factor 62 because the drop in wind speed will not be as great resulting in a higher close-range wind speed 54 and/or a higher wind speed at the rotor plane 58. As such, controlling a wind turbine 12 to operate based at an induction factor 62 allows for a simplified control scheme that passively accounts for any number of condition-based factors that may influence the operation of the wind turbine 12.

Figure 9:
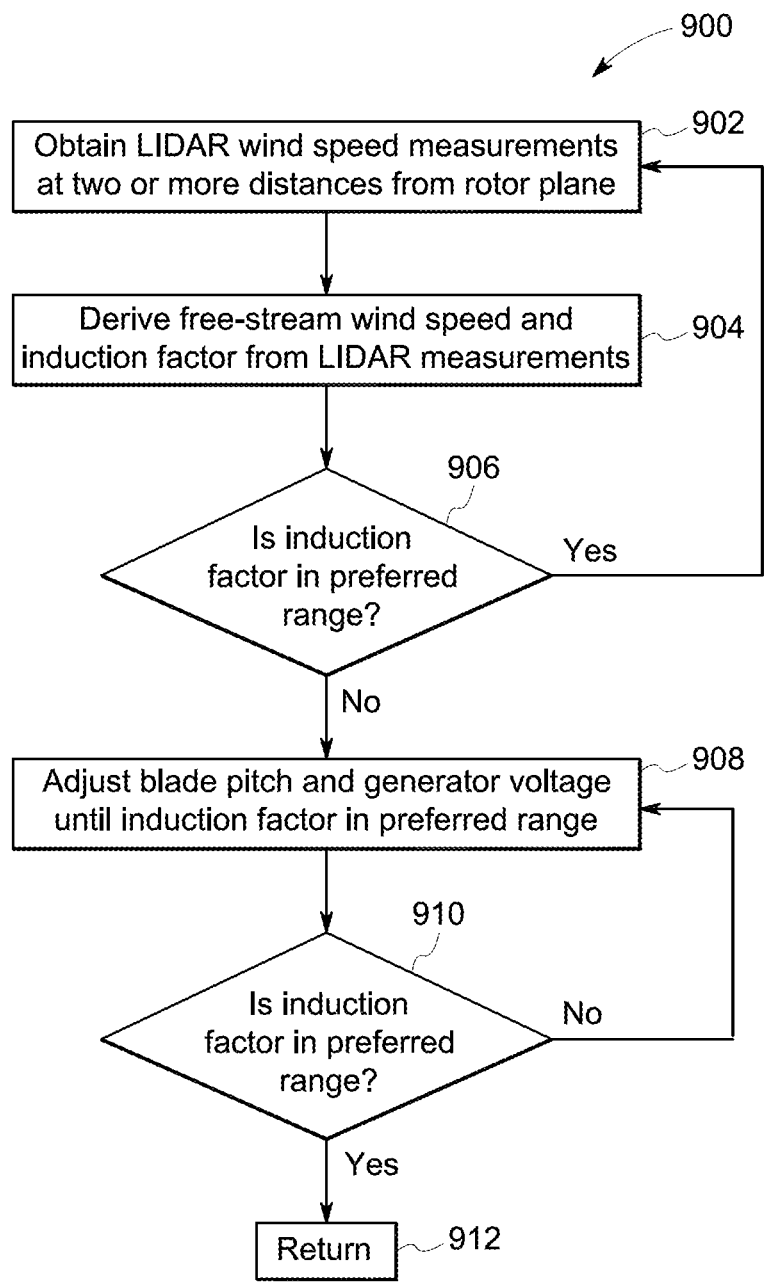
FIG. 9 is a flow chart illustrating a method of controlling a wind turbine engine.

FIG. 9 is a flow chart illustrating a method of controlling a wind turbine 12 engine in accordance with the present embodiments. At 902, the method comprises obtaining LIDAR 30 wind speed measurements at two or more distances from the wind turbine rotor plane 58. In a first preferred embodiment, obtaining LIDAR 30 wind speed measurements at two or more distances comprises obtaining LIDAR 30 wind speed measurements at multiple upstream locations 46A-46D, as illustrated in FIG. 3. In a second preferred embodiment, obtaining LIDAR 30 wind speed measurements at two or more distances comprises obtaining LIDAR 30 wind speed measurements at the areas of increased wind velocity 44A and 44B and at the proximal free-stream regions 56, as discussed above and illustrated in FIG. 2. At 904, the method comprises deriving both a free-stream wind speed 60 and an induction factor 62 from the LIDAR 30 measurements. As discussed above, method step 904 may be accomplished in both the first preferred embodiment and the second preferred embodiment. Stated otherwise, in both the first preferred embodiment and the second preferred embodiment it is possible to derive a free-stream wind speed 60 and calculate an induction factor 62 based on the LIDAR 30 measurements.

Still referring to FIG. 9, at method step 906, the method comprises determining if the induction factor 62 is between 0.27 and 0.29 (or other "ideal" operating range). If the induction factor 62 is between 0.27 and 0.29, the method comprises returning to step 902. If the induction factor 62 is not between 0.27 and 0.29, the method comprises proceeding to step 908. At 908, the method comprises adjusting the wind turbine blade pitch 68 and generator voltage (not shown) until the induction factor 62 is between 0.27 and 0.29. As discussed above, adjusting the wind turbine blade pitch 68 will vary the effective blade surface area that is impacted by the wind, thereby affecting the induction factor 62. Similarly, as discussed above, adjusting the generator voltage (not shown) will vary the resistive force associated with spinning the generator which in turn will vary the torque necessary to spin the wind turbine rotor 20 which in turn will change the rotational speed of the turbine rotor 20, thereby affecting the induction factor 62. The method may include operating the wind turbine 12 at other possible induction factor 62 ranges. For example, other ideal ranges may include induction factors 62 below 0.33 or induction factors 62 between about 0.20 and 0.33, 0.25 and 0.30, 0.27 and 0.29 as well as other ranges.

At method step 908, real-time or near real-time gradients can be used to assess the feedback between a change in either the wind turbine blade pitch 68 or the generator voltage (not shown) and the induction factor 62. For example, increasing the wind turbine blade pitch 68 an incremental amount may move the induction factor 62 further away from an ideal induction factor 62 between about 0.27 and 0.29. In this example, the wind turbine blade pitch 68 may be returned to the original value or even decreased from the original value in order to control the induction factor 62 to a value between about 0.27 and 0.29. In another example, increasing the wind turbine blade pitch 68 an incremental amount may not result in any change to the induction factor 62 in which case the control system may assess the gradient between the generator voltage (not shown) and the induction factor 62, etc. A look-up table based on current turbine operation can suggest the optimal order in which to assess the control gradients. Using the control scheme described above employing control gradients between a change in either the wind turbine blade pitch 68 or the generator voltage and the induction factor 62 it is possible to accurately control the wind turbine 12 to an enhanced operating condition without the need for precise aeromaps, which, as discussed above, may take considerable time to develop and also may not result in optimized control of the wind turbine 12.

At method step 910, and again referring to FIG. 9, the method comprises determining if the induction factor 62 is between 0.27 and 0.29. If the induction factor 62 is between 0.27 and 0.29, the method comprises proceeding to step 912, the final step in the method. If the induction factor 62 is not between 0.27 and 0.29, the method comprises returning to step 908.

Figure 10:
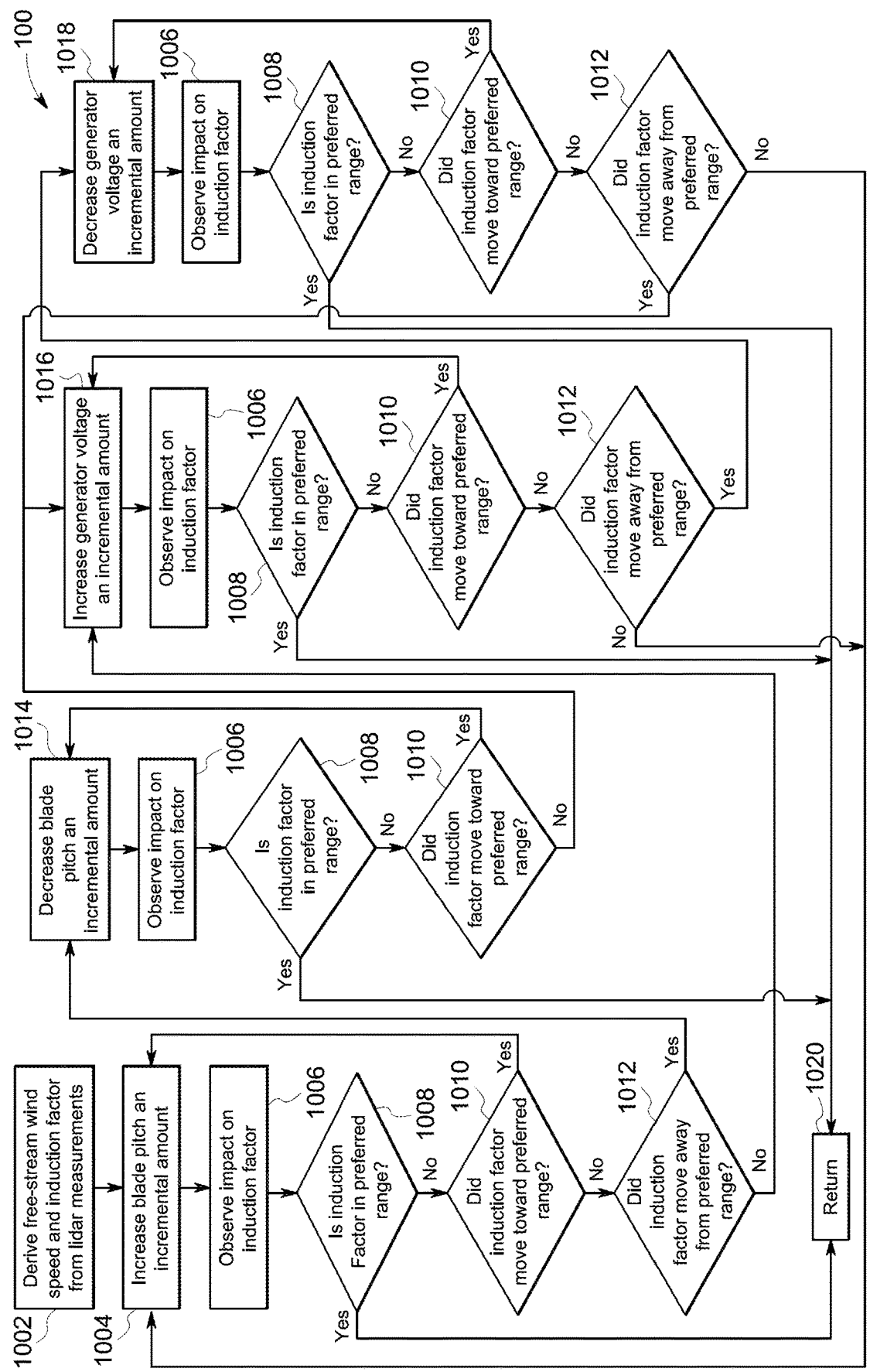
FIG. 10 is a flow chart illustrating a method of controlling a wind turbine engine.

FIG. 10 is a flow chart illustrating a method of controlling a wind turbine engine 12 in accordance with the present embodiments, using gradient between a change in either the wind turbine blade pitch 68 or the generator voltage (not shown) and the induction factor 62. The flow chart illustrated in FIG. 10 can be viewed as an expansion of method step 908 in FIG. 9 during which the blade pitch 68 and generator voltage (not shown) are adjusted until the induction factor 62 is in the ideal range. At method step 1002, the free-stream wind speed 60 and induction factors 62 are determined from LIDAR 30 measurements. At method step 1004, the blade pitch 68 is increased an incremental amount. At method step 1006, the impact of the change in blade pitch 68 on the induction factor 62 is observed. At method step 1008, the method comprises determining if the ideal induction factor 62 has been achieved. At method step 1010, the method comprises determining if the induction factor 62 moved toward the ideal range as a result of the change in turbine blade pitch 68. At method step 1012, the method comprises determining if the induction factor 62 moved away from the ideal range as a result of the change in turbine blade pitch 68.

Still referring to FIG. 10, at method step 1014, the blade pitch 68 is decreased an incremental amount. At method step 1016, the generator voltage (not shown) is increased an incremental amount. At method step 1018, the generator voltage (not shown) is decreased an incremental amount. At method step 1020, the ideal induction factor 62 has been achieved and no further changes to the turbine blade pitch 68 or generator voltage (not shown) are required. It is understood that as implemented, the control scheme illustrated in FIG. 10 will follow the decision tree and/or logic outlined in the flow chart rather than simply following the method steps in the order they are described above. For example, if the induction factor 62 moved toward the ideal range at method step 1010, per the control logic, the method proceeds back to step 1004 where an additional incremental increase to the blade pitch 68 is performed.

Figure 11:
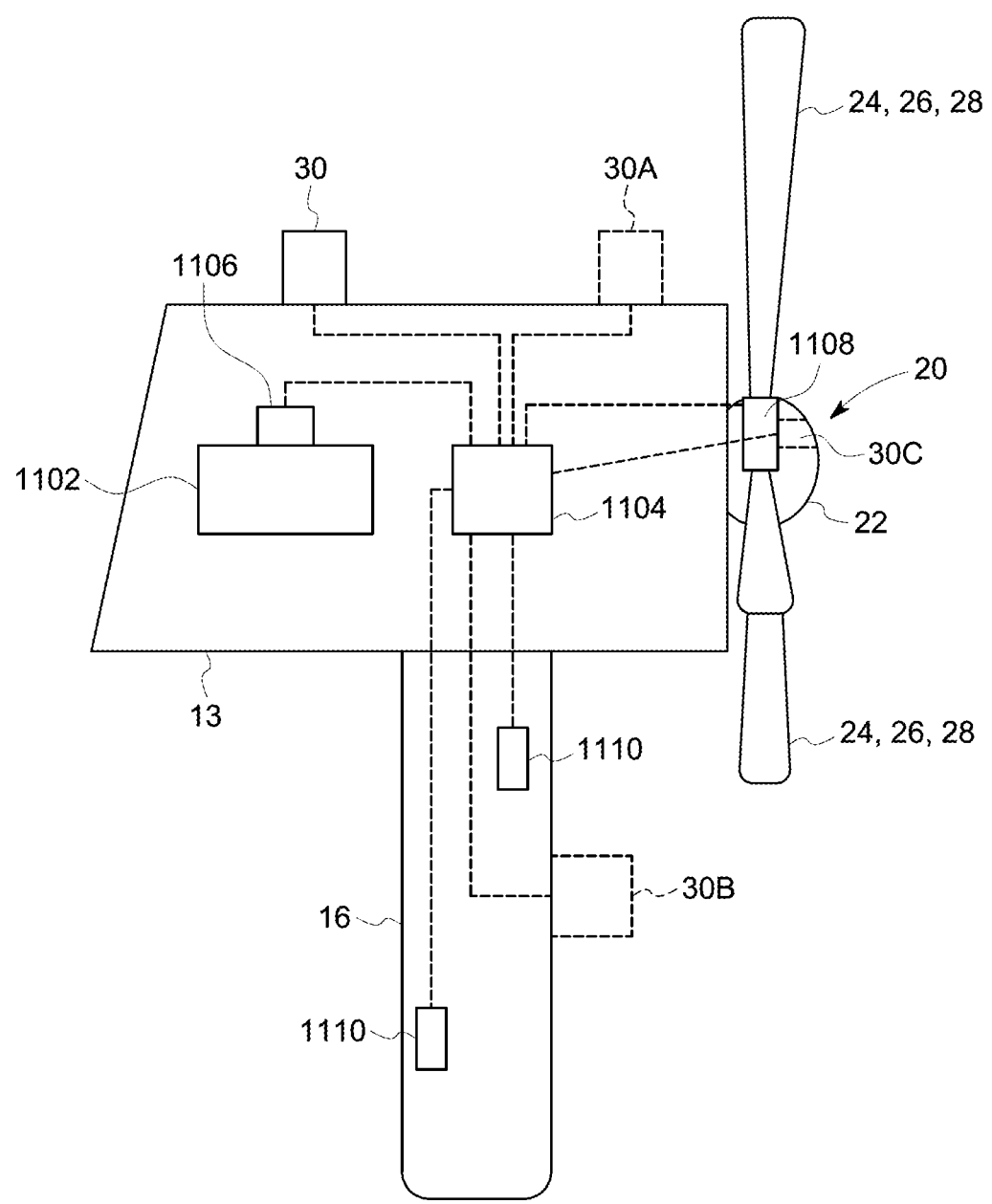
FIG. 11 is a diagrammatic side view illustration of the wind turbine, in accordance with certain aspects of the present specification.

FIG. 11 is a diagrammatic side view illustration of the wind turbine 12, in accordance with certain aspects of the present specification. Tower 16 supports nacelle 13 on which rotor 20 is mounted. Rotor blades 24, 26, 28 attach to the wind turbine 12 at hub 22. At least one blade pitch actuator 1108 mechanically couples to rotor blades 24, 26, 28 for adjusting the pitch of each of the rotor blades 24, 26, 28. Generator 1102 is mechanically coupled to rotor 20 (mechanical coupling not shown) and generates electricity as rotor 20 rotates. A generator controller 1106 controls the generator voltage. A wind turbine control unit 1104 is communicatively coupled to the generator controller 1106 as well as to the blade actuator 1108. The wind turbine control unit 1104 may be mounted within the nacelle 13, on the tower 16, on the ground or elsewhere. A LIDAR based sensing device 30 may be disposed on the nacelle 13. The LIDAR based sensing device 30 may be located at an alternative location 30A on the nacelle 13. The LIDAR based sensing device 30 may also be mounted at a location 30C on the hub or at a location 30B on the tower. In addition, there may be multiple LIDAR based sensing devices 30 that are employed. The LIDAR based sensing devices 30, 30A, 30B, 30C are communicatively coupled to the wind turbine control unit 1104. In alternative embodiments, there may be one or more cup anemometers at any of the locations 30, 30A, 30B, 30C shown in FIG. 11, in place of or in addition to one or more LIDAR based sensing devices 30, 30A, 30B, 30C. The control unit controls the wind turbine via the blade pitch actuator and the generator controller based on an induction factor 62 derived from the multiple signals received at the wind turbine control unit 1104 from the LIDAR based sensing device(s) 30 and/or other wind speed measurement devices such as cup anemometers.

Referring still to FIG. 11, the wind turbine 12 may include one or more strain gauges 1110 disposed on the tower 16 or elsewhere on the wind turbine. The one or more strain gauges 1110 provide yet another methodology for determining the induction factor 62 and free-stream wind speed 60. The strain gages 1110 provide a measure of how much the tower 16 is deforming as a result of thrust applied by the air to the wind turbine 12. For example, as air passes the wind turbine 12, the air applies a thrust or force on the wind turbine 12 which causes the tower 16 to deform. The strain gauges 1110 sense the deformation of the tower 16 and send a signal to the wind turbine control unit 1104 that is proportional to and/or representative of the magnitude of the deformation. Stated otherwise, the more thrust applied by the air to the wind turbine 12 as the air moves past the wind turbine 12, the greater the magnitude of the sensed strain by the strain gauges 1110. The thrust applied by the air to the wind turbine 12, as determined via measurements from the strain gauges 1110, can be converted into an estimate of the wind speed at the rotor plane 58 by the following equation:

$$WScr = \mathrm{sqrt}(Thrust/(2 * rho * A\_d)),$$

where rho is the air density, and A_d is the area swept by the rotor disc or turbine blades 24, 26, 28.

Once the wind speed at the rotor plane 58 is known, induction factor 62 can be determined using the free-stream wind speed 60, which can be measured via LIDAR-based sensing device 30, cup anemometer or other wind speed sensing devices, or estimated via an aeromap or operation map such as that in FIG. 5 and the current power production of the generator 1102. Therefore, determining an induction factor 62 can be achieved using strain gauges 1110, without the need for a LIDAR-based sensing device 30. Wind turbines 12 can be controlled to an induction factor 62 that is determined using at least one strain gauge or alternatively using a LIDAR-based sensing device 30. Although systems that use strain gauges 1110 can determine both the induction factor 62 and the free-stream wind speed 60 without the use of LIDAR-based sensing device 30, systems that use strain gauges 1110 may also at times employ LIDAR-based sensing device 30. Controlling a wind turbine 12 to induction factor 62 is possible and beneficial (as discussed above) regardless of which sensors are used to determine induction factor 62.

In the methods and systems described above, the blade pitch 68 may be adjusted using a blade pitch actuator (not shown). The generator voltage may be adjusted using a generator controller (not shown) configured to adjust the generator voltage and other generator operating parameters such as resistance, electrical inductance, current, etc. The methods and systems described above may be implemented using programmable logical controllers (PLCs), application-specific integrated circuits (ASICs), field-programmable gate arrays (FPGA), other electrical and/or electronic devices, components and/or computer hardware.

The systems and methods for controlling the device presented hereinabove provide accurate estimates of potential wind speeds based on the oncoming wind speeds and simulated and experimentally determined characteristics of wind speed induction in the vicinity of a wind turbine. Furthermore, the systems and methods allow enhanced control of the device. In particular, the systems and methods allow use of the induction, the oncoming wind speeds upstream of the hub area 41, the wind speeds in the areas of increased wind velocity 44A and 44B and the wind speeds in the proximal free-stream regions 56 and/or the accurate estimates of the potential wind speeds for feedback controls to enhance the operation of the wind turbine system 10 for enhanced power extraction. Hence, the systems and methods enable accurate assessment of and control to enhanced operating points. Additionally, by using multiple methodologies and systems for determining induction factor 62 and free-stream wind speed 60 in connection with each other, the systems and methods enable the identification of potential measurement errors associated with wind speed measurement. Accordingly, use of the present systems and methods allows enhanced utilization by extracting more energy from the wind through operation of the wind turbine 12 at a higher coefficient of power $C_P$ 64.

The systems and methods for controlling the device presented hereinabove provide wind turbine control systems that account for variations in factors that impact the operation of the wind turbine such as ambient conditions, wind speed, wind direction as well as turbine blade deterioration and fouling. By controlling the wind turbine to operate at a specific induction factor 62 or range of induction factors 62, any number of condition-based factors that may influence the operation of the wind turbine 12 are accounted for passively. The systems and methods described herein also allow for a simplified wind turbine control scheme that simultaneously accounts for a multitude of condition-based factors. Induction effects upstream of a wind turbine 12 as well as at the rotor plane 58 may be sensed remotely using LIDAR or other means thereby allowing the wind turbine 12 to operate at an enhanced operating point resulting in increased power extraction.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling a wind turbine, the method comprising:
   receiving a first signal representative of a first wind speed at a first distance spaced axially apart from the wind turbine;
   receiving a second signal representative of a second wind speed at a second distance spaced axially apart from the wind turbine, the second distance being different than the first distance;
   deriving a free-stream wind speed from, at least, the first wind speed, the second wind speed, the first distance, and the second distance;
   calculating an induction factor by subtracting a close-range wind speed from the free-stream wind speed and dividing the resulting difference by the free-stream wind speed; and
   adjusting at least one of a wind turbine blade pitch and a wind turbine generator voltage, thereby moving the induction factor toward a desired operating range for extracting power from the wind turbine.

2. The method of claim 1, further comprising receiving an additional signal representative of a wind speed at a rotor plane of the wind turbine and utilizing the additional signal to determine the close-range wind speed.

3. The method of claim 1, wherein a desired operating range comprises an induction factor range between about 0.20 and about 0.33.

4. The method of claim 2, further comprising: receiving the additional signal from at least one strain gauge, the at least one strain gauge disposed on a tower of the wind turbine.

5. The method of claim 1, wherein at least one of receiving the first signal and receiving the second signal further comprises receiving a signal from at least one LIDAR-based sensing device.

6. The method of claim 1, further comprising detecting a change in the induction factor as a result of a change in one of a wind turbine blade pitch of the wind turbine and a generator voltage, after adjusting at least one of the blade pitch and the generator voltage.

7. A wind turbine, comprising:
   a wind turbine rotor and a plurality of blades mounted on the wind turbine rotor;
   at least one sensing device, the at least one sensing device measuring:
     a first signal representative of a first wind speed at a first distance spaced axially apart from the wind turbine rotor; and
     a second signal representative of a second wind speed at a second distance spaced axially apart from the wind turbine rotor;
   a blade pitch actuator for adjusting a pitch of at least one of the plurality of blades;
   a generator controller for adjusting a voltage output of a wind turbine generator; and
   a control unit communicatively coupled to the blade pitch actuator and the generator controller, the control unit controlling the wind turbine via the blade pitch actuator and the generator controller based on an induction factor,
   wherein the induction factor is derived by subtracting a close-range wind speed from a free-stream wind speed and dividing the resulting difference by the free-stream wind speed, the free-stream wind speed derived from, at least, the first wind speed, the second wind speed, the first distance, and the second distance.

8. The wind turbine of claim 7, wherein the at least one sensing device further comprises at least one of a laser radar system (LIDAR) sensor.

9. The wind turbine of claim 8, wherein the control unit controls the wind turbine to an induction factor range between about 0.20 and about 0.33.

10. The wind turbine of claim 9, wherein the first wind speed and the second wind speed are representative of the wind speed at an axial distance upstream of the wind turbine, and wherein the free-stream wind speed is the speed of the undisturbed natural air flow at a location upstream of the wind turbine.

11. The wind turbine of claim 10, further comprising an additional wind-turbine mounted strain gauge for measuring a wind speed at a rotor plane of the wind turbine.

12. The wind turbine of claim 7, wherein the control unit comprises at least one of a programmable logical controller (PLC), an application-specific integrated circuit (ASIC), and a field-programmable gate array (FPGA).

13. A wind turbine control system, comprising:
at least one sensing device measuring a first signal representative of a first wind speed at a first distance spaced axially apart from the wind turbine rotor and a second signal representative of a second wind speed at a second distance spaced axially apart from the wind turbine rotor;
a control unit communicatively coupled to the at least one sensing device and controlling an operating point of a wind turbine toward a desired induction factor range for extracting power from the wind turbine, the control unit configured to derive a free-stream wind speed from, at least, the first wind speed, the second wind speed, the first distance, and the second distance;
at least one blade pitch actuator communicatively coupled to the control unit; and
at least one generator controller communicatively coupled to the control unit for adjusting a generator voltage;
wherein the control unit controls the at least one blade pitch actuator and the at least one generator controller to adjust at least one of a blade pitch and the generator voltage, respectively, to bring the operating point of the wind turbine toward the desired induction factor range, wherein an induction factor of the desired induction factor range is derived by subtracting a close-range wind speed from the free-stream wind speed and dividing the resulting difference by the free-stream wind speed.

14. The wind turbine control system of claim 13, further comprising at least one of a nacelle-mounted laser radar system (LIDAR) sensor and a nacelle-mounted cup anemometer.

15. The wind turbine control system of claim 14, wherein the desired induction factor range is between about 0.20 and about 0.33.

16. The wind turbine control system of claim 13, wherein the control unit comprises at least one of a programmable logical controller (PLC), an application-specific integrated circuit (ASIC), and a field-programmable gate array (FPGA).

17. The wind turbine control system of claim 16, further comprising at least two sensing devices for sensing wind speed, wherein a first sensing device of the at least two sensing devices measures wind speed in at least one of an area of increased wind velocity and a proximal free-stream region, the proximal free-stream region being an area in the vicinity of a wind turbine rotor plane in which the wind speed is approximately equal to the free-stream wind speed, and wherein wind speed measurements from the at least two sensing devices are used to determine at least one of a magnitude of a transverse wind speed and a wind speed measurement error, the transverse wind speed being the speed of a component of the wind in a direction orthogonal to an axial direction.

* * * * *